United States Patent [19]

Suciu

[11] Patent Number: 5,773,383

[45] Date of Patent: Jun. 30, 1998

[54] METHOD OF MAKING SOLID ACID CATALYSTS WITH METAL CORES

[76] Inventor: George Dan Suciu, 417 Prospect St., Ridgewood, N.J. 07450-5100

[21] Appl. No.: 528,937

[22] Filed: Sep. 15, 1995

[51] Int. Cl.$^6$ ..................................................... B01J 21/02
[52] U.S. Cl. .......................... 502/355; 502/325; 502/326; 502/347; 502/302; 502/227; 502/231; 502/229
[58] Field of Search ..................................... 502/355, 325, 502/326, 347, 302, 227, 231, 229

[56] References Cited

U.S. PATENT DOCUMENTS

| | | | |
|---|---|---|---|
| 2,999,074 | 9/1961 | Block et al. | 502/227 |
| 4,582,818 | 4/1986 | De Clippeleir et al. | 502/231 |
| 4,719,190 | 1/1988 | Drago et al. | 502/64 |
| 4,783,575 | 11/1988 | Schmidt et al. | 585/748 |
| 4,834,866 | 5/1989 | Schmidt | 208/65 |
| 4,929,800 | 5/1990 | Drago et al. | 585/744 |
| 5,254,793 | 10/1993 | Wu et al. | 585/726 |

OTHER PUBLICATIONS

Melchor, et al. J. Chem. Soc. Faraday Trans. 1, 1986, 82, 1893–1901 Date: 1986–No Month.

Roebuck, A.U. & Evering, B.L., Ind. Eng. Chem. Pro Res. Develop, vol. 9, No. 1 pp. 76–82 (1970)–No Month.

Becker, R.E., Wei, J. Your. Catalysis vol. 46 pp. 365–371, 372–381 (1977)–No Month.

Hönicke, D., Appl. Catalysis vol. 5 (1983) pp. 179–198 –No Month.

Laan, J.A.M., Ward, J.P., Chemistry & Industry (London) 1987, Jan 5., pp. 34–35.

*Primary Examiner*—Glenn Caldarola
*Assistant Examiner*—Nadine Preisch

[57] ABSTRACT

A method is provided for producing a solid acid catalyst having a structure including a metal core having essentially an entire outer surface covered by a layer of metal oxide including a multitude of active sites provided with Lewis Acidity. The method involves an oxidizing step to form a layer of metal oxide and a halogenating step to produce a metal oxide layer with multiple active sites exhibiting Lewis Acidity.

6 Claims, 1 Drawing Sheet

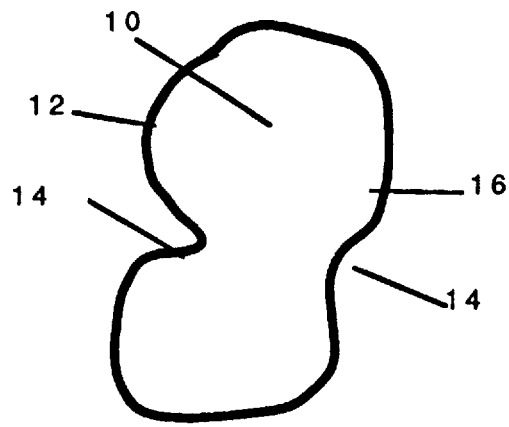
Fig. 1-A
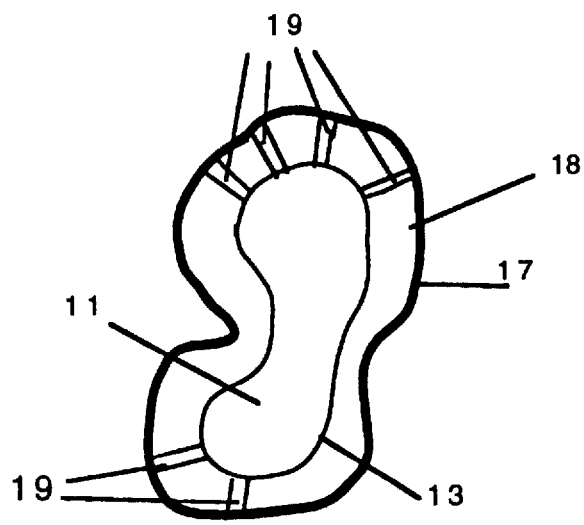
Fig. 1-B

METHOD OF MAKING SOLID ACID CATALYSTS WITH METAL CORES

BACKGROUND—FIELD OF INVENTION

This invention refers to new structures of solid catalysts containing acidic sites of Lewis type, methods for preparing such catalysts and regeneration of spent catalysts.

BACKGROUND—DISCUSSION OF PRIOR ART

The catalysts obtained by the methods of this invention can be used in Friedel Crafts reactions, such as alkylation of iso-paraffins with olefins, alkylation of aromatics with olefins or with halogenated paraffins, and other reactions, such as isomerization of paraffins, isomerization of mono-olefins, etc.

Typical for this class of catalysts are metal halides, among which aluminum chloride, aluminum bromide, iron trichloride, antimony pentafluoride, etc., are best known.

In many reactions using acidic catalysts, the catalytic material, typically AlCl3, is contained in the pores and on the surface of a support, made of an inert material. The composition, shape, size and mechanical properties of the inert support are selected to suit the particular reaction requirements. Oxides, such as silicas, aluminas, silica-aluminas, zeolites, have been used as supports for AlCl3.

The known methods used for preparing such catalysts, include subliming AlCl3 and allowing it to condense into the pores of the support, attaching AlCl3 to the support from solutions, etc. According to U.S. Pat. No. 2,999,074 (Bloch), anhydrous AlCl3 and particles made of calcined alumina, are heated together with stirring, under hydrogen pressure for a prescribed time at 250° C. The AlCl3 sublimes and is incorporated in the pores of the alumina support. By adding 0.2–2.0% platinum metal to the support, before the AlCl3 is added, improved catalytic properties are obtained. The activity of these catalysts is believed to be associated to the presence of the >Al—O—AlCl2 moieties.

The deficiency of the above catalyst is that the AlCl3 is not solidly anchored to the support. In operation, the AlCl3 is easily leached out and the catalyst loses activity.

Methods have been developed for preparing catalysts with improved stability, which are resistant to the leaching of the AlCl3. According to U.S. Pat. Nos. 4,719,190 (Drago) and 4,929,800 (Drago), AlCl3 and a silica-containing support, are maintained for a few hours in refluxing carbon tetrachloride (CCl4). During this operation, chlorinated alumina is anchored to the silica support via chemical bonds which result by the reaction of one of the chlorine atoms of AlCl3 with a surface —OH group of the silicagel and the elimination of one molecule of HCl. The moieties Si—O—AlCl2 and (Si—O)2—AlCl, which result from these reactions are chemically active and are claimed to be strongly anchored to the support. The activity of the catalyst depends on the surface area of the support. Catalyst activity increases with increasing surface area of the support. However, when the surface area exceeded approximately 330 sq.m/g, a reduction in the activity was measured.

U.S. Pat. Nos. 4,783,575 (Schmidt) and 4,834,866 (Schmidt), describe a vapor phase procedure for anchoring aluminum chloride to alumina supports.

U.S. Pat. No. 5,254,793 (Wu), prepares a catalyst on basis of AlCl3, on support of BPO4 with alumina and/or silica, in a solvent of chlorinated hydrocarbons.

The deficiency of the catalysts of the prior art is that they show a rapid rate of deactivation, due to formation within their pores, of polymeric or coke deposits. Since the support and the catalytic material are prepared separately, it is impractical to taylor the properties of the support to the specific requirements of the catalytic reaction. No efficient means are known, to control the coking in these types of acidic catalysts.

The following physico-chemical considerations pertaining to solid acidic catalysts, will help to clarify the differences between the catalysts of the present invention and those of the prior art.

The "activity", of an acidic catalyst, is a measure of the number of moles of a particular reagent, which are converted per unit mass of catalyst, in unit time. As established by experiments, the activity of solid acid catalysts depends on the strength of the active sites their number and the accessibility by the reacting species. The "turn-over number" (TON), represents the number of molecules reacted in unit time on one active site.

The "strength" of an acid site characterizes the property of that site to activate certain bonds of the molecules they interact with, towards specific ionic reactions. Strong acid sites, can activate stronger molecular bonds, than sites of weaker acidity. For acids supported on aluminas or silicas, the strength increases in the series: phosphoric acid<sulfuric acid<AlCl3, etc. The overall range of the acid strength is characteristic for the acid species used. For many supported Lewis acids, the strength of the acid sites can be correlated with their location within the catalyst structure. In the reaction conditions employed, Lewis acid sites can interact with specific hydrogen containing compounds, to form protonated Bronsted acids.

The interaction between a reagent molecule and the walls of the narrow pores of the support will increase its ability to react on the active sites located in the pores. The active sites located in micropores, with diameters below 2 nanometers (nm), have the highest acid strength. The active sites located in the mesopores (diameters of 2 nm–50 nm) or in the macropores (diameters larger than 50 nm), have decreasing strengths.

The supports used for the solid acid catalysts have high internal areas, on which the acid active sites are located. The micro and mesopores are the main contributors to the internal surface areas of the catalysts.

A broad distribution of the strength of the acid sites has undesired effects on the catalyst performance. While some of the acid active sites have strengths appropriate for accelerating the reaction of interest, other sites have lower strengths and are inactive. Still, some other sites have higher strengths than required by the reaction of interest and catalyze undesired reactions, leading to by-products and multiple follow-reactions of the primary products. Some of the secondary and follow-products will be molecules of large sizes which stay on the active sites and block them for further reaction, i.e. cause deactivation. In general, the catalyst support and the catalytically active components are prepared separately and their interaction is not optimized.

The supported catalysts of the prior art are characterized by a wide range of pore diameters and lengths, which strongly influences the diffusion rates of the reactants and of the primary reaction products. The flow of raw materials towards, and of products, away from the active sites, becomes slower as the pore diameters decrease and as the lengths of pores increase and become more convoluted (tortuous). The easy access of the reagent molecules to the active sites, followed by the rapid removal therefrom of the reaction products, are required conditions for a high TON, or high catalyst activity. The intricate network of pores which exist in the known supported catalysts, limits the TON, by introducing intra-particle diffusion resistances, also known as "diffusional barrier". All supported acid catalysts known in the art have large diffusional barriers. The diffusion of the raw materials and products, to and from the reaction sites respectively, through long, narrow pores within the support, gives occasion to unwanted side-reactions. Reactions involving olefins are particularly sensitive to the formation of gums and polymeric materials which block the access of the raw materials to the active sites and reduce the catalytic activity.

As known in the art, catalysts based on aluminum chloride, are often non selective, due to the broad distribution of acid strengths of the active sites. A number of approaches have been used for modifying the strength of the acid sites, in order to improve the selectivity of the desired product. In the alkylation of isoparaffins with olefins, the selectivity of AlCl3-based catalysts was improved by using complexants and inhibitors. Among the various compounds tested, the chlorides of selected metals (copper, lead, silver, lithium, etc.), were used as additives to the aluminum chloride catalysts and proved useful in inhibiting undesired reactions [A. K. Roebuck, B. L. Evering, Ind. Eng. Chem. Prod. Res. Develop., Vol. 9, No. 1, page 76–82 (1970)].

Solid acidic catalysts are used to activate strong bonds within the reagent molecules and produce fast reactions. It has been shown (Becker, E. R. and J. Wei, Jour. Catalysis, Vol. 46, p. 365, 372 (1977)), that in order to reduce the diffusional barrier and improve selectivity, the activity of the catalyst particle should be concentrated in a thin layer, on the surface of the particle. No satisfactory method is known to prepare such catalyst structures, on basis of the known support particles. The excessive thickness of the active layer in the solid acidic catalysts known in the art and the excessive length of the pores of the rest of the support are important factors which contribute to the rapid deactivation.

The solid acid catalysts of this invention, are made of acidic catalytic material incorporated in a metal oxide support of predetermined pore structure. The oxide support forms a layer of predetermined thickness, on the surface of a metallic core particle.

Catalyst regeneration comprises the group of operations by which catalysts which have lost their activity are processed, in order to remove the carbonaceous materials within their pores and to recover the catalytic activity. Burning under controlled conditions, of the carbonaceous materials from the catalyst particles, is one of the key operations in catalyst regeneration. Often, controlled burning is preceded by stripping with inert gas, or steam.

In supported acidic catalysts, the active sites within the micropores are the first to deactivate and the most difficult to regenerate. The active sites in catalysts containing AlCl3, are destroyed by steam and during the burning of the carbonaceous materials from the pores of the support. The regeneration, of supported AlCl3 catalysts, would actually involve the complete reformation of the active sites within a structure of the support, which can be less pure than when the catalyst was first prepared. Impurities consisting mainly of carbonaceous materials or coke, usually have a negative effect on the activity of the regenerated catalyst. For this reason, the practice of the previous art is to discard and not to regenerate, deactivated catalysts of supported Lewis acids.

The preparation and utilization of the acidic catalysts based on metal halides and particularly aluminum chloride, as known in the art, are associated to a number of disadvantages.

Catalyst activity is difficult to control. The presence within the catalyst, of a broad range of strengths of the acid sites, results in the formation of by-products and in deactivation.

Catalyst activity and catalyst life are deteriorated due to the high diffusional barriers, which are caused by the small pores associated with the high surface areas.

Catalyst manufacture involves a large number of operations requiring the maintenance of strict anhydrous conditions.

Catalyst deactivation is caused by the reaction or loss of the halogen (chlorine) and by the blocking of the pores by polymeric materials.

Catalyst regeneration is not practical. The complexity of the pore network within the catalyst particles, requires severe conditions during the regeneration in order to remove completely the polymeric materials formed therein. The operations used for re-forming the AlCl3, which was destroyed during the removal of the carbonaceous materials, are similar in complexity, equipment demands and operating conditions, to the manufacture of the fresh catalyst. Regenerated catalysts perform usually worse than fresh ones, due to the irreversible changes which occur within the support.

OBJECTS AND ADVANTAGES

Accordingly, several objects and advantages of this invention are:

To provide new and improved catalysts possessing Lewis acidity, comprising a metal core covered by a relatively thin layer of metal oxide, which is the support of the components providing the catalytic activity. The novel catalysts have higher resistance to leaching, lower diffusional barrier and better stability in operation, compared to the similar catalysts of the prior art.

A further object, is a new method to produce solid Lewis acid catalysts possessing improved selectivity and low diffusional barrier, on basis of metal alloys of predetermined composition.

A further object, is to produce acid catalysts having as active compounds, chemically bound chlorine and other selected halogens, contained within the metal oxide layer.

Another object of this invention is to provide unique and novel methods for regenerating the subject catalyst, by means of which the catalytic activity is recovered.

Further objects and advantages of this invention will become apparent from a consideration of the drawings and ensuing description.

DESCRIPTION OF THE DRAWINGS

FIG. 1-A shows a schematic cross-section through a catalyst precursor. FIG. 1-B depicts a schematic cross-section of a catalyst particle, with a porous oxide layer covering a metal core of arbitrary shape.

SUMMARY OF THE INVENTION

The present invention provides methods to produce solid acid catalysts in which the active sites are contained with in a layer of porous metal oxide, which covers the surface of an inert core made of metal.

The activity of the catalyst of this invention is due to acidic sites, contained within moieties which are chemically bound to the metal oxide. The porous metal oxide which hosts the active sites, forms a thin layer on the surface of an inert body, of a convenient size, which defines the shape of the overall catalyst particle. This is different from the solid acid catalysts known in the art, where the whole catalyst particle is made of a porous structure which contains the active sites dispersed throughout.

According to one embodiment, the catalyst is prepared by a two-step chemical treatment of the initially all-metal precursor particle, consisting of aluminum or mixtures of aluminum and selected metals.

In a first step, the surface layer of the metallic precursor particle is converted to a porous oxide layer.

In the second step, catalytically active sites are produced within the oxide layer. The catalytic activity is due to Lewis acid sites which are generated by the treatment of the porous metal oxide layer with halogenated compounds, under specified conditions.

According to another embodiment, the generation of the porous oxide layer and the generation of the active sites are achieved in one step, by treating the precursor with selected chemical reagents, in specified conditions.

According to a further embodiment, catalyst which has lost activity (spent), is submitted to a sequence of chemical operations, comprising combustion of carbonaceous deposits followed by reaction with halogen compounds, whereby its activity is regenerated.

The catalysts of this invention can have various shapes and sizes, as suitable for use in various reactors as fixed beds, fluidized beds, slurries, etc.

DRAWING FIGURES

The drawing of FIG. 1-A represents a schematic cross-section through a typical body of a catalyst precursor, used as starting point for producing the catalysts of this invention.

The drawing of FIG. 1-B depicts a schematic cross section through a catalyst particle of this invention.

REFERENCE NUMERALS IN THE DRAWINGS.

| | | | |
|---|---|---|---|
| 10 | metallic body of precursor | 11 | metal core of catalyst |
| 12 | outside surface of metal body | 13 | surface of metal core |
| 14 | surface cavities | 16 | region of body of precursor, located under surface |
| 17 | outside surface of oxide layer | | |
| 19 | pores | 18 | oxide layer |

DETAILED DESCRIPTION OF THE INVENTION

A. Catalyst Structure

With reference to FIG. 1-A, a metallic body 10, of a predetermined shape and size, is used as a catalyst precursor. Body 10 has an outside surface 12, which might contain a multitude of surface cavities 14. A region 16 of metal body 10 located immediately under surface 12 is submitted to a treatment of this invention and thereby acquires catalytic properties, as described below.

A metal core 11 is covered over substantially its whole surface 13, by an adhering layer of metal oxide 18 which, towards the outside has a surface 17. Metal oxide layer 18, is transfers by a multitude of pores 19, which have openings on the outside surface 17 of the oxide layer and are dead-ended towards the surface 13 of the metal core 11. Surface cavities 14 which may be present on the outside region of the metallic core 10, are also covered by the metal oxide layer 18 and contribute to increasing the surface area of the catalyst particle. Pores 19 have lengths of the order of the thickness of oxide layer 18.

There is correspondence between specific regions of the precusor of FIG. 1-A and catalyst of FIG. 1-B. The chemical reactions of this invention, convert the metal of region 16, located under surface 12 of metal precursor 10, into layer of metal oxide 18. For this reason, surface 13 of the metal core 11, is generally smaller in extent than surface 12.

One of the preferred catalysts, is based on aluminum, oxygen and chlorine. The structure of this catalyst comprises the core of metallic aluminum, of a size and shape suited for the intended reaction and reactor type, coated over practically its whole surface, by a layer of aluminum oxide, which is thin in relation to the dimension of the aluminum core. The activity of the catalyst is due to the active sites, which are acidic in nature and contain moieties including chlorine, oxygen and aluminum atoms.

B. Catalyst Synthesis

The synthesis of the catalyst of this invention comprises the following operations:

1.0. Selection of the metal body and of the size and shape of the finished catalyst.

2.0. Synthesis of the oxide layer.

3.0. Synthesis of the catalytic composition.

Operations 2 and 3 can be implemented simultaneously, to produce catalyst according to this invention, as:

4.0. One-step preparation.

Each of these operations can be implemented in one or more manners, as described hereunder. For each operation the preferred manner of implementation is pointed out. Other manners of performing the preparation, according to this invention, are also indicated. The following description refers to catalytic bodies which have the structure schematically depicted in FIG. 1.

1.0. The metal body.

The chemical nature of the metal core determines its suitability for a specific catalytic application.

The preferred metals for preparing acidic catalysts with application to Friedel-Crafts and similar reactions include aluminum and alloys containing aluminum.

Other metals can be used, such as: iron, antimony, tantalum, and metals belonging to the group of Rare Earths, or lanthanides, of the Periodic System of the elements. These elements have halides which can be used as Friedel-Crafts catalysts. Among the Rare Earths, lanthanum, cerium, praseodym, neodymium, samarium, europium, as well as a mixture of various such metals, known in the industry under the name of "Mix Metal", can be used.

The present invention provides methods to incorporate in the metal body, predetermined concentrations of metals which moderate the activity and improve the selectivity the solid acid catalysts. The activity of the preferred catalyst, on basis of aluminum, can be moderated by incorporating in the core, metals selected from the group including copper, lead, silver, magnesium, zinc and mixtures thereof.

Metal bodies for other catalysts of this invention, consist of alloys containing metals selected from the group including aluminum, iron, antimony, lanthanum etc. and mixtures thereof, mentioned above, together with metals selected from the group including: copper, lead, silver, magnesium, zinc, boron, bismuth, iron, cobalt, nickel, manganese and mixtures thereof. The halides of these metals have a moderating effect on the activity of the AlCl3 catalysts.

The shape and size of the metal body determine the shape and size of the catalyst. Preferred shapes and sizes are those well known in the art, for catalyst particles used in fixed bed reactors: cylinders with cross sections of various shapes, Rashig rings, saddles, helices, etc. Other preferred shapes for fixed bed reactors are monolith bodies provided with multiple channels of any convenient shapes and structured bodies of high geometric surface area. The structured bodies are obtained by assembling flat or bent sheets of metal, so as to obtain structures which will promote a good contact between the fluids involved in the reaction of interest and the catalytic materials, located on the surface of these structures.

For the catalyst particles used in reactors involving moving beds or fluidized beds, the metal cores are preferably of spherical or rounded shape. The diameter of the metal cores used in fluid bed applications, can range between a few tens of microns to a few hundreds of microns (not exceeding approx. one millimeter). The diameters of the particles used in moving bed reactors, can be of 3–5 mm, or more.

All the above general shapes of catalyst bodies are well known to those skilled in mass transfer and in chemical reactor engineering.

2.0. The oxide layer

The oxide layer covers the surface of the metal particles or of the metal sheets which form the core of the catalyst. The lowest values for the thickness of the oxide layer is determined by the need to produce catalysts which show a prescribed activity. In the range of thicker layers, the limiting factor is the adhesion to the core and the mechanical stability. The oxide layer contains a large number of pores. Most of the pores pass across the oxide layer. The pores are open towards the outside of the particle and dead-ended in the surface of the metal core, or in a layer of non-porous metal oxide, which may cover it. Due to the small thickness of the oxide layer, most of the pores are short, compared to the dimensions of the catalyst particle. The preferred layer thickness can range between 0.1 micrometers and 50 micrometers. Thicker layers are acceptable, provided they adhere to the metal core.

The consequence of the small thickness and high porosity of the oxide layer is that the diffusion barrier is smaller than for catalyst pellets or extrudates. The selectivity to the desired products is increased, since their over-reaction is substantially reduced.

The methods which can be used for converting the outside region of the metal core, to a layer of metal oxide, are of electrochemical and of chemical nature:

Anodic oxidation is a known method of producing porous oxide layers, on the surface of aluminum bodies. By performing anodic oxidation of aluminum under controlled conditions [Hoenicke, D., Appl. Catalysis, 5 (1983) 179–198], porous oxide layers are produced, with thicknesses which can vary between a fraction of a micrometers, to a few micrometers. This method of producing oxide coatings, is suitable for bodies with simple geometries of the outside surfaces. The anodic oxidation of internal surfaces of complex bodies or monoliths is impractical, as known to those familiar with electrochemical reactions.

There are a number of chemical methods for producing oxide layers over the surface of bodies of arbitrary shape, made of pure metals or alloys.

According to the present invention, one of the preferred methods for producing oxide layers on the surface of aluminum and its alloys, involves two steps.

2.1. In the first step, a phenol (i.e. phenol, or a selected phenol derivative) is allowed to react with the surface of aluminum particles, to form the corresponding Al-phenolate, with hydrogen evolution. The phenolate adheres to the surface of the unreacted core of the aluminum body.

2.2. In the second step, the surface phenolate is decomposed, by hydrolysis or thermally, whereas a layer of aluminum oxide, coating the metal core, is generated.

With reference to step 2.1., the reaction of aluminum metal with phenol is known. The Al-phenolate, which is soluble in excess phenol, is known as catalyst in the alkylation of phenol with olefins at elevated temperatures [J. A .M. Laan, J. P. Ward, Chem. & Industry (London), p.34, Jan. 5, 1987].

For the purpose of the present invention and different from the known art, it is necessary that the Al-phenolate remains attached to the surface of the aluminum particles. There are various ways for carrying out step 2.1.

2.1.1. According to a preferred method to perform the surface reaction, aluminum particles or structures having large geometric surface areas, such as monoliths, are reacted with a predetermined quantity of phenol, in liquid phase. In order to prevent the Al-phenolate to separate from the surface of the aluminum body on which it formed, the reaction is performed in presence of an excess of an inert liquid, miscible with the phenol, but in which the Al-phenolate has practically no solubility. Aliphatic or aromatic hydrocarbons, as well as mixtures thereof can be used to this purpose. Hydrocarbons with boiling points within ±10° C. of the boiling point of phenol, are most appropriate for this application, although hydrocarbons with boiling points outside this range can also be used.

The reaction is performed as follows: The aluminum particles or the body of metallic aluminum, representing the core of the catalyst, are placed in a vessel provided with a reflux condenser and are covered with a solvent consisting of a mixture of poly-alkyl benzenes. The vessel is heated in order to bring the solvent to reflux. A solution of phenol in the solvent is now gradually introduced into the vessel. The start of the reaction is indicated by the evolution of hydrogen, which is removed through the condenser. After completing the addition of the necessary amount of phenol, the refluxing is continued until the evolution of hydrogen has stopped.

The total amount of phenol used in the reaction is function of the thickness of the oxide layer which is desired to form on the surface of the aluminum core, the shape and the surface/volume ratio of the aluminum body which is submitted to the attack by phenol. Suitable oxide films are produced when approx. 1–10% of the initial aluminum metal, is converted to aluminum-phenolate. The exact correlation between the thickness of the oxide layer produced and the amount of phenol required depends directly on the shape, that is on the surface/volume ratio of the aluminum particles. For each particular shape, the amount of phenol to be used is best determined by practical tests.

2.1.2. Another manner to prepare the oxide layer, consists in passing a hot stream of phenol vapors, through a heated fixed bed containing the aluminum metal packing, or a heated fluidized bed made of the aluminum metal particles to be coated. The layer of Al-phenolate produced, will adhere to the metal substrate. After the desired amount of aluminum metal has converted, as measured by the amount of hydrogen released in the effluent, the flow of phenol vapors is stopped.

2.1.3. Still other chemical agents comprising: alkyl phenols (such as cresols, xylenols, etc.) and chlorophenols, can be used for generating the surface layer of Al-phenolate.

2.2. In the second step, the surface oxide is generated by the decomposition of the surface Al-phenolate. A number of alternate procedures can be followed, as indicated below.

2.2.1. According to a preferred procedure, at the end of the hydrogen evolution the liquid solvent is drained. A hot stream of dry, inert gas is introduced into the vessel, in order to vaporize and remove all organic compounds not bound chemically. A temperature in the range 170°–250° C. is suitable for this operation. Upon completion of this drying operation, the temperature is increased further, to 300°–500° C., at which levels the thermal cracking of the Al-phenolate takes place. The decomposition products are removed by the flow of inert gas. The aluminum particles remain coated with a layer of oxide, without any traces of adsorbed water.

2.2.2. According to another procedure, upon the completion of the phenol attack on the aluminum surface, the solvent is drained from the vessel and steam is introduced into the vessel. The use of superheated steam is recommended, in order to avoid the formation of undesired liquid water, by condensation. The steam causes the hydrolysis of the Al-phenolate to phenol and aluminum oxide. The excess steam also strips out from the pores of the oxide layer, the traces of phenol generated by hydrolysis. The steaming operation is best carried out at 250°–500° C.

2.2.3. According to still another procedure, after the completion of the phenol attack on the Al surface, the solvent is cooled while in the vessel; small amounts of liquid water are introduced gradually, while the liquid phases are circulated through a loop which includes a cooler. It is desirable that the amount of free water present in the system at any time, does not form a separate phase. Following the hydrolysis of the Al-phenolate, the liquid is drained and stripping steam is introduced into the vessel, to remove the organic liquids adhering to the particles.

2.3. Also, other families of chemical agents can be used for forming the oxide layer.

2.3.1. Metallic aluminum reacts at ambient or reflux temperatures, with substances selected from the group of aliphatic or aromatic amines, such as: guanidine, aniline, alkyl-anilines, etc., having at least one unsubstituted H atom at the amine function. Aluminum amides are produced, with hydrogen release. By calcination in air, at 150°–500° C., the layer of amide is transformed into an adherent layer of oxide.

2.3.2. Similarly, a layer of aluminum acetate which results from the treatment of metallic aluminum with acetic acid, chloroacetic acid, etc., at reflux temperatures. When heated in air, to 150°–500° C., the acetate layer will convert to a layer of aluminum oxide. At the end of either of the above procedures 2.2., and 2.3., the resulting metallic particles are coated with a layer of oxide. A calcination step, under controlled condition results in a porous layer of dry oxide which will become the support for the acidic sites. The porous layer of oxide produced as hereinabove described, adheres to the surface of the core metal.

3.0. The catalytic material

The conversion of the oxide layer to catalytically active material is performed, in a preferred manner, by treating the oxide-coated particles with vapors of chlorinated compounds at elevated temperature. The reaction of the chlorine contained in the chlorinated compounds interacts with the oxide layer and generates the catalytically active composition.

The selection of chlorinated compounds which can be used for preparing the catalytic composition of this invention is quite broad.

Organic chlorinated compounds, such as the chloro alkanes and especially poly-chloro alkanes and perchloro alkanes, are well suited to the purpose of the present invention.

Preferred chlorinated compounds are: chloroform, trichloro ethylene, etc. Most preferred is carbon tetrachloride and other per-halogenated organic compounds. A per-halogenated organic compound is an organic molecule in which all hydrogen atoms have been replaced by halogen atoms. Other compounds, such as bromo alkanes or mixed chlorinated and fluorinated alkanes (some of them known under the trade name of Freons), can also be used. Further compounds, are acid chlorides, such as phosgene, acetyl chloride, benzoyl chloride and similar ones, which can also be used within the scope of this invention. Mixtures of these chlorides, or between the chlorides and other compounds, in liquid or gas phase (such as hydrogen, etc.) can also be used.

Inorganic chlorinated compounds, such as chlorides and oxichlorides which have high vapor pressures and low boiling points, are best suited for producing the catalytic compositions of this invention. Preferred acid chlorides are: $PCl_5$, $PCl_3$, $POCl_3$, $SOCl_2$, $SO_2Cl_2$, $NOCl$, $SiCl_4$, $SnCl_4$, $TiCl_4$, $ZrCl_4$, $VOCl_2$, $CrOCl_2$, etc. Mixtures of various inorganic chlorides, or between inorganic and organic chlorides, or with non chlorinated compounds, in liquid or gas phase, can also be used, within the provisions of this invention.

The selection among the chlorinating agents is made also in consideration of the desired chemical state of the final catalyst. As an example with practical application, if the metal core contains copper, as alloy or deposited over parts of the aluminum surface and it is desired that the catalyst contains mostly the chloride of the copper in mono-valent state, [Cu(1)Cl], one will use, as known to those skilled in the art, only chlorinating agents which are neither oxidizing, nor contain oxygen.

The contacting of the solid oxide-coated metal with the vapor-phase chlorinating agent, is performed by any of the means known to those skilled in the art. For example, one obtains the catalytically active material, by allowing a stream of dry, inert gas, containing vapors of the chlorinated compound to pass through a fixed bed containing the oxide-coated metal particles or bodies, maintained at the treating temperature. Other devices can be used for the contacting the oxide-coated aluminum particles with the chlorinating agent: fluidized beds, rotating drums, rotating kilns, etc.

The temperature used in the chlorinating step, for catalysts of this invention, on basis of metallic aluminum, can range between approx. 100° C. and 550° C., depending on the presence and nature of any additional metal alloyed with the aluminum metal core. The treatment temperature is also influenced by the nature of the chlorinating compound. The lower temperature limit is determined by the initiation of the chlorination of the oxide by the chlorinated compounds. The higher limit is determined by the stability of the finished catalyst or by the melting point of the metal core. For catalysts which have aluminum metal core, the preferred treating temperature is between 250° C. and 350° C., when the chlorinating agent is carbon tetrachloride.

4.0. One-step preparation

According to a further preferred embodiment of this invention, the synthesis of the oxide coating and of the catalytic material, described in the foregoing paragraphs, can be implemented in one single step. To this purpose, the aluminum core is reacted at treatment temperatures with a reagent, or mixture of reagents which will cause both the oxidation of the metal with generation of the oxide layer as well as the chlorination of oxide layer, in the same process step. Such reagents can have both oxidation function and halogenation functions, specifically oxichlorinating function in the same molecule. Alternately, mixtures of reagents possessing oxidation function with reagents providing the halogenation function may be used.

Preferred reagents for performing the one-step oxidation and halogenation, specifically chlorination and possessing the oxidation and halogenation function in the same molecule are SO2Cl2, NOCl, etc. Preferred reagents for performing the one-step oxidation and chlorination by using separate reagents for the oxidation and for the halogenation functions are mixtures of SO3 with CCl4, etc.

Other similar reagents which may be used are SOCl2, POCl3, COCl2, organic oxichlorides such as acetyl chloride, oxalyl chloride, benzoyl chloride, etc. with or without the presence of free oxygen in the gas phase.

The oxidation and the halogenation reactions can be performed in liquid phase or in vapor phase.

4.1. For the liquid-phase synthesis, a solvent which is stable in the reaction conditions, such as CCl4, is used as reaction medium. The metal bodies, to be transformed into catalyst, are immersed in the liquid which is heated to reflux. The oxidating and chlorinating agents, are added gradually. Upon addition of the prescribed amounts of these reagents, refluxing is continued until gas evolution stops. The gases resulting from the reaction are neutralized. The produced catalyst is recovered under anhydrous conditions, loaded into the reactor, where it is heated to remove traces of adsorbed solvent.

4.2. The vapor-phase synthesis is performed by introducing the metal bodies or particles which will constitute the core of the catalysts, in a reaction vessel, as a fixed bed or as a fluid bed, or moving bed. The reaction vessel is heated to the reaction temperature. The metal bodies are contacted with a gas stream containing vapors of the selected oxidation and selected chlorination agents, or the predetermined agent or mixture of agents, for performing the conversion of the outer region of the metal bodies into a layer of porous metal oxide, containing acid active sites.

The temperature for the one-step preparation in vapor phase is similar to that used in the chlorination step of the stage-wise preparation method described above.

When mixed halogens, as for instance fluorine and chlorine, are desired as active sites, the generation of the catalytic layer is performed, during a one-step or a two-step operation, as described above, by using as halogenating agents compounds which contain both fluorine and chlorine, such as CF2Cl2, oxichloride of fluoro-acetic acid, etc.

The catalysts of this invention, can be prepared by the methods described above, starting from a metal core made of an alloy of two or more metals. The resulting catalyst will be made of a metal core coated by a layer consisting of a mixture of chlorinated oxides of the metals contained in the alloy. The metals incorporated in each of the specific alloys are selected on basis of their ability to provide a better performance for a specified reaction, than the other catalysts. When used in specific reactions, such catalysts will produce improved selectivities and will have longer lives than those based on pure aluminum, or other pure metals or alloys.

It is known in the art that by incorporating small concentrations of selected noble metals into the solid acidic catalysts used in Friedel Crafts reactions, the life of the catalyst can be extended to a considerable extent, if molecular hydrogen is included in the feed. Such practices will have similar beneficial effects when applied in conjunction with the catalysts of this invention.

That which is claimed is:

1. A process for converting a metallic precursor into a solid acid catalyst having a structure including a metal core having essentially an entire outer surface covered by a layer of metal oxide including multiple active sites exhibiting Lewis Acidity, comprising:
   (a) oxidizing a region located directly underneath an outer surface of said metallic precursor to form a layer of metal oxide,
   (b) halogenating said layer of metal oxide to form said metal oxide layer including multiple active sites exhibiting Lewis Acidity.

2. The process according to claim 1, wherein the said metallic precursor is aluminum or an alloy of aluminum and a metal selected from the group consisting of iron, cobalt, nickel, magnesium, zinc, manganese, copper, silver, lead, bismuth, elements of the lanthanide series and mixtures thereof.

3. The process of claim 1, wherein step (a) comprises reacting a phenol with the said region located directly underneath said outer surface of said metallic precursor to form a metal-phenolate and subsequently decomposing the said metal-phenolate to produce said layer of metal oxide.

4. The process of claim 1, wherein step (a) comprises reacting said region located directly underneath said outer surface with a basic nitrogen compound in the form of an amine to form a metal-amine compound and subsequently decomposing the said metal-amine compound to produce said layer of metal oxide.

5. The process of claim 1, wherein step (b) comprises reacting the said metal oxide surface layer with a halogenated compound selected from the group consisting of organic chlorinated compounds, inorganic chlorinated compounds, organic fluorochlorides and mixtures thereof.

6. A process for converting a metallic precursor into a solid acid catalyst having a structure including a metal core having essentially an entire outer surface covered by a layer of metal oxide including multiple active sites exhibiting Lewis Acidity comprising simultaneously oxidizing and halogenating a region located directly underneath an outer surface of said metallic precursor by reacting said metallic precursor with oxychlorinating reagents selected from the group consisting of inorganic metallic oxychlorides, organic acid chlorides, organic fluorides and mixtures thereof.

* * * * *